Patented Mar. 29, 1932

1,851,844

UNITED STATES PATENT OFFICE

WILLIAM R. JEAVONS, OF CLEVELAND HEIGHTS, AND MAHLON J. RENTSCHLER, OF WILLOUGHBY, OHIO

PROCESS OF PRESERVING CAUSTIC MATERIALS

No Drawing.   Application filed May 6, 1929.   Serial No. 360,990.

This invention has for its object to provide for the effective and convenient elimination from clay ware or ceramic products of scum such as is frequently noticeable on bricks employed in the building industry. The invention relates more particularly to the production of a composition of matter for the purpose mentioned which is capable of being readily and conveniently incorporated into the clay from which such products are made, which can be handled without injury, which can be shipped in ordinary paper containers, which can be stored without deterioration, and which can be manipulated by workmen of ordinary skill.

A common cause of scum formation on clay products is that many clays, as well as the water used in pugging or kneading the same, contain a percentage of soluble salts such as magnesium sulphate ($MgSO_4$), calcium sulphate ($CaSO_4$) potassium sulphate ($K_2SO_4$) and sodium sulphate ($Na_2SO_4$) which are deposited as scum on the surface of the molded mass on the evaporation of the solvent water. Often in the manufacture of clay products these salts will produce scum areas upon their surfaces through the simple drying out of the pug water used in kneading the clay. Variations in intensity and spread of the scum deposit may occur by reason of slight variations in the compactness and porosity at scattered points throughout the molded clay mass as well as through variations in evaporating conditions at different portions of the clay-mass surface; at any rate, haphazard scum areas often appear on molded and formed projects upon the evaporation of the pugging or kneading water, causing much subsequent trouble and loss.

On products such as completely burned brick laid in walls, soluble salts contained in their mass will leach out under moist weather conditions and cause unsightly scum on the surfaces from which such leaching moisture evaporates.

Ofttimes detrimental or scumming salts in mortar or cement, used in laying brick walls, will on the weathering of such structures be dissolved and carried through or over the bricks and be deposited as scum on their surfaces.

Heretofore, where a cure for scumming has been attempted, barium has been used almost universally in the form of barium carbonate, for the reason that it is the only barium compound that can be handled with any degree of satisfaction under the widespread conditions attending the initial kneading of raw clay, probably because it is a stable product and its efficiency, low though it may be, is unimpaired by shipping and storage conditions. However, it is well known that its efficiency is exactly proportionate to its solubility, and as the solubility of pure precipitated barium carbonate is only about twenty-two parts per million of distilled water, its action is necessarily slow and the distribution of the powder for fragmental solution throughout the clay mass is difficult and often imperfect.

The readily soluble barium salts which are neutral in reaction, such as barium chloride ($BaCl_2$), barium fluoride ($BaF_2$), barium nitrate ($Ba(NO_3)_2$), barium acetate $$(Ba(CH_3COO)_2),$$

etc., are not well adapted for scum-prevention, inasmuch as the scumming salt content of the clay varies considerably in different portions of the same clay bank and, unless the quantity of the barium salts is at all times kept in relatively correct proportion to the quantity of the salts in the clay, the result will be unsatisfactory, since with too little of these neutral barium salts there will be inefficiency and, if too much of these barium salts are employed, they will themselves form a detrimental scum on the product; furthermore the use of any of these soluble neutral barium salts results in the formation with the salts in the clay of secondary soluble salts, which of themselves cause scumming.

Soluble compounds of barium which do not possess the disadvantages of the neutral soluble salts of barium above described are such basic soluble compounds of barium as barium monoxide ($BaO$) and barium hydrate ($Ba(OH)_2$), which are considered ideal for scum prevention work, but which are of such unstable character that their practical use in ceramic processes has heretofore been considered impossible.

Barium oxide is exceedingly hygroscopic, absorbing moisture instantly when exposed to the atmosphere and forming barium hydrate which, because of its tremendous affinity for carbon dioxide, is immediately converted into the relatively insoluble carbonate and thus loses its basic vitality.

Barium monoxide and barium hydrate are very caustic, producing severe burns if contacted with the skin; furthermore they are difficult and troublesome to be handled by inexperienced workmen.

Barium monoxide, which is especially desirable for our purpose because it is the most vital of the soluble basic barium compounds as well as because it possesses several other advantages to be pointed out hereinafter, is intensely hygroscopic and excessively caustic; if drenched with water, it slacks with the evolution of such intense heat as to ignite wood or other carbonaceous materials with which it may be in contact; and in consequence, when in a pure state, it must be shipped in heavy air-tight steel drums at high freight rates.

Crystallized barium hydrate is properly slacked barium monoxide; but if the monoxide is not properly slacked, the hydrate is of little value, as by reason of the intense heat evolved the conversion will be into a fused partially dehydrated hard insoluble mass.

We have discovered a novel manner of preserving the desirable properties of soluble basic barium compounds and have thereby overcome the difficulties enumerated to the practical use of these compounds and have made possible their shipment in paper bags at a low rate of freight to the ceramic trade at remote points and in condition to be stored indefinitely and to be used safely, economically and successfully for scum-prevention work.

We accomplish these results by comminuting bone dry, finely powdered, colloidal, siliceous dust with dehydrated, finely powdered, soluble, basic barium compound or compounds such as barium monoxide, barium hydrate, barium silicate, barium aluminate, etc. until a perfectly uniform mixture results. In practice, we prefer to use barium monoxide for the reason that it contains a higher percentage of active barium than any other barium compound and is not attached to any detrimental acid radical, and for the colloidal siliceous material we prefer to use highly refractory, clean, dry fireclay, but many natural and artificial materials, when properly dried and ground, are also satisfactory for our purpose. The clay and the soluble barium compound, or compounds, are weighed off in such proportions and ground together so that the finished product will have uniformly disseminated therethrough approximately 20% of soluble barium. This proportion of ingredients has proven very satisfactory and efficient in ceramic work for scum-prevention, but we do not limit ourselves to these exact proportions. Where the colloidal nature of the fireclay is to be preserved, it is extremely important that the same be not overheated in any portion. Our experiments indicate that the protective action of the fireclay is best realized when the latter is in a colloidal condition, as the individual particles of finely ground barium compound, or compounds, are thereby covered or coated very effectually by clay so that on exposure of the mixture to air the barium particles do not absorb moisture or carbonic acid gas. The alumina and silica contents of the clay are important because they react at a high temperature with any excess of barium compound, or compounds, which might be present in the clay above that necessary to react with the soluble sulphates in the clay.

The incorporation of the soluble barium oxide with a neutral clay or siliceous mass is accomplished by apportioning the oxide and the mass in a more or less rough but perfectly dry state, then mixing and pulverizing the mixture; this last step thoroughly distributing the oxide throughout the mass.

When barium hydrate is used as the barium base, the dry hydrate crystals may be pulverized separately before mixing with the clay mass, if desired; or they may be pulverized with the mass in the same manner as when barium oxide is used; or the barium hydrate may be dissolved in water and this water mixed with the clay or silicate mass, which is subsequently pulverized after having been thoroughly dried. If unusual stability of the barium content is desired, this result may be accomplished by heating the mixture to a high degree in the process of its drying, thereby more intimately associating the barium with the silicate of the clay. The loss of colloidality by this process is compensated for by the chemical reaction between the clay and the barium hydrate.

Inasmuch as the different basic barium compounds that may be effective for the purposes of our invention have greater or less reactivity value in proportion to their weight or bulk—as, for instance, barium oxide slacked to barium hydrate and containing the water of crystallization is of greater weight or bulk than the oxide from which such hydrate is derived—care should be taken to correctly apportion the carrier mass with reference to the specific barium compound employed for the production of a composition of determinate strength relative to its weight or volume, as the observance of this precaution renders simple and accurate the apportionment of the barium reactivity to the clay masses employed for the manufacture of ceramic products by persons of ordinary skill.

In practice we prefer to use barium oxide as the barium base as in production the oxide is always perfectly dry, and its high activity is easily rendered more or less dormant by its dilution with the dry pulverized clay or silica; while barium hydrate is simply barium oxide hydrated, or slaked (i. e. plus water and minus heat) and takes more physical manipulation than the oxide to condition it for practical handling and usage.

The mixture of soluble basic barium compound, or compounds, with fireclay is not offensive to the sense of smell; the causticity of the barium compounds is shrouded and it is consequently not injurious to the hands or mucous membrances of workmen. The material consequently may be shipped in paper bags, thus taking a low rate of freight. When the material is mixed with water, the anhydrous barium compound slacks uniformly without any sensible or local heat formation. In this way the soluble barium compound spreads readily and rapidly throughout the clay mass in the pug mill, when used in the ceramic industry, reacting with the soluble sulphates and producing insoluble barium sulphate, thereby preventing the formation of scum without the production of any deleterious by-products.

This application is in some respects a continuation of our application No. 276,495, filed May 9, 1928.

Having thus described our invention, what we claim is:

1. The process of preparing a soluble basic barium compound for shipment, storage, and use in the ceramic arts which consists in pulverizing the said compound, and permanently protecting the particles thereof by thoroughly and intimately mixing the same with a preponderance of finely pulverized anhydrous colloidal material.

2. The process of preparing a soluble basic barium compound for shipment, storage, and use in the ceramic arts which consists in mixing the said compound while in a finely pulverized condition with a preponderance of finely pulverized anhydrous colloidal material.

3. The process of preparing a soluble basic barium compound for shipment, storage, and use in the ceramic arts which consists in mixing the said compound while in a finely pulverized condition with a preponderance of finely divided anhydrous colloidal non-hygroscopic material.

4. A composition adapted for incorporation in the mass from which ceramic products are manufactured, the said composition comprising an intimate mixture of fresh finely pulverized soluble basic barium compound with a preponderance of finely divided anhydrous colloidal material.

5. A composition adapted for incorporation in the mass from which ceramic products are manufactured, the said composition comprising a finely pulverized basic barium compound having the particles thereof protected by finely pulverized anhydrous colloidal material.

6. A composition adapted for incorporation in the mass from which ceramic products are manufactured, the said composition comprising a finely pulverized basic barium compound having the particles thereof separated and protected by finely pulverized anhydrous colloidal material.

In testimony whereof, we hereunto affix our signatures.

WILLIAM R. JEAVONS.
MAHLON J. RENTSCHLER.